United States Patent
Kashi

(10) Patent No.: US 12,118,505 B2
(45) Date of Patent: Oct. 15, 2024

(54) DOCKING SMART LOCKERS SYSTEMS, METHODS, AND DEVICES

(71) Applicant: Smiota Inc., Fremont, CA (US)

(72) Inventor: Manjunatha Kashi, Milpitas, CA (US)

(*) Notice: Subject to any disclaimer, the term of this patent is extended or adjusted under 35 U.S.C. 154(b) by 37 days.

(21) Appl. No.: 18/178,499

(22) Filed: Mar. 4, 2023

(65) Prior Publication Data
US 2023/0206172 A1    Jun. 29, 2023

Related U.S. Application Data

(63) Continuation-in-part of application No. 17/086,391, filed on Oct. 31, 2020, now abandoned.

(60) Provisional application No. 63/316,415, filed on Mar. 4, 2022.

(51) Int. Cl.
*G06Q 10/0836* (2023.01)
*G06N 20/00* (2019.01)

(52) U.S. Cl.
CPC ........ *G06Q 10/0836* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,799,051 B2 * | 10/2020 | Schmider | A47B 47/0091 |
| 2015/0356801 A1 * | 12/2015 | Nitu | G07C 9/00904 340/5.61 |
| 2018/0300679 A1 * | 10/2018 | Mahmood | G06Q 10/0836 |
| 2019/0035186 A1 * | 1/2019 | Nitu | G07F 9/001 |
| 2019/0313828 A1 * | 10/2019 | Schmider | E05G 1/024 |
| 2019/0384762 A1 * | 12/2019 | Hill | G06F 16/2272 |
| 2020/0019930 A1 * | 1/2020 | Kashi | G06Q 10/0833 |
| 2022/0027848 A1 * | 1/2022 | Kashi | G06Q 10/0836 |

* cited by examiner

*Primary Examiner* — Carlos Garcia

(57) ABSTRACT

Disclosed herein are mobile smart lockers configured for implementation in various locations including residential locations to overcome last mile delivery challenges. Further disclosed are systems and methods for providers of geolocational sites to offer sites for acceptance and requestors of smart locker hubs to select sites for stationing mobile smart locker devices.

6 Claims, 9 Drawing Sheets

DOCKING SMART LOCKERS SYSTEMS, METHODS, AND DEVICES

CROSS-REFERENCE TO RELATED APPLICATIONS

This application also claims priority to U.S. Non-Provisional Patent application Ser. No. 17/0,086,391 filed on Oct. 31, 2020 and titled, "SMART LOCKER AGNOSTIC OPERATING PLATFORM".

This application also claims priority to U.S. Provisional Patent Application No. 63/316,415 titled, "DOCKING SMART LOCKERS SYSTEMS, METHODS, AND SERVICES" filed on Mar. 4, 2022.

The entirety of the aforementioned applications are incorporated by reference herein.

FIELD OF THE INVENTION

This invention relates to docking smart locker devices and mechanisms of deployment and interconnectivity of such docking smart locker devices to overcome challenges in the last mile of delivery. The invention also relates to methods for implementing docking smart locker devices.

BACKGROUND

Currently, last mile delivery has received notable attention, specifically with respect to parcel deliveries. However, there are several problems and challenges associated with the last mile of delivery. For instance, providing delivery of parcels to consumers can be time consuming and costly. In some respects, there is a lack of infrastructure to support the delivery requirements needed to support last mile delivery. Furthermore, there is a dearth of last mile deployment mechanisms. For instance, smart lockers while available at commercial establishments are limited in number and require a great number of hurdles to implement. Furthermore, commercial establishments typically offer a limited array of inventory that can be sold through smart lockers at commercial establishments.

In another aspect, there is a large segment of the market that does not have access to last mile infrastructure and therefore cannot sell local or small company owned goods and services to consumers due to lack of last mile options. Furthermore, there are infrastructural in efficiencies that cause couriers to deliver packages inefficiently, slowly and at a high cost. For instance, a courier required to drop fifty packages at fifty different residential locations will slowly execute such tasks and over a period of time will tackle such duties. This causes delays in the overall delivery timeline. As such, many such solutions are required for last mile delivery challenges.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Disclosed here are several non-limiting embodiments of mobile smart locker devices configured for travel to and from various destinations including strategic residential locations in some embodiments. In an aspect, the mobile smart locker devices can be loaded with parcels and positioned at locations for consumers and sellers to exchange goods. As such, a homeowners driveway can be rented to major couriers and the couriers can load the mobile smart lockers with packages. All such packages can be delivered by the courier or another deliverer to a location such as a rented driveway, parking lot, commercial building space, third party locations or other space capable of fitting a mobile smart locker device. Accordingly, consumers can pickup and drop off packages (e.g., returns, pre-stamped packages, etc.).

Furthermore, couriers can load the mobile smart lockers configured with wheels at warehouse or dispatch centers to load the lockers with parcels. Furthermore, a courier vehicle can latch onto a mobile smart locker and drive the unit to the target destination. In other embodiments, autonomous enabled smart lockers can attach to the mobile smart lockers and drive them to predetermined destinations based on GPS coordinates. As such, users (e.g., local neighborhood people) can complete package pick-up and delivery transactions by accessing the smart lockers on a 24/7 basis and overcoming last mile delivery, cost, and infrastructure challenges. Furthermore, couriers can delivery packages more efficiently by effectively delivering a series of packages in one shot rather than taking the time to deliver or pickup parcels to/from each residential location independently.

Figure 1:
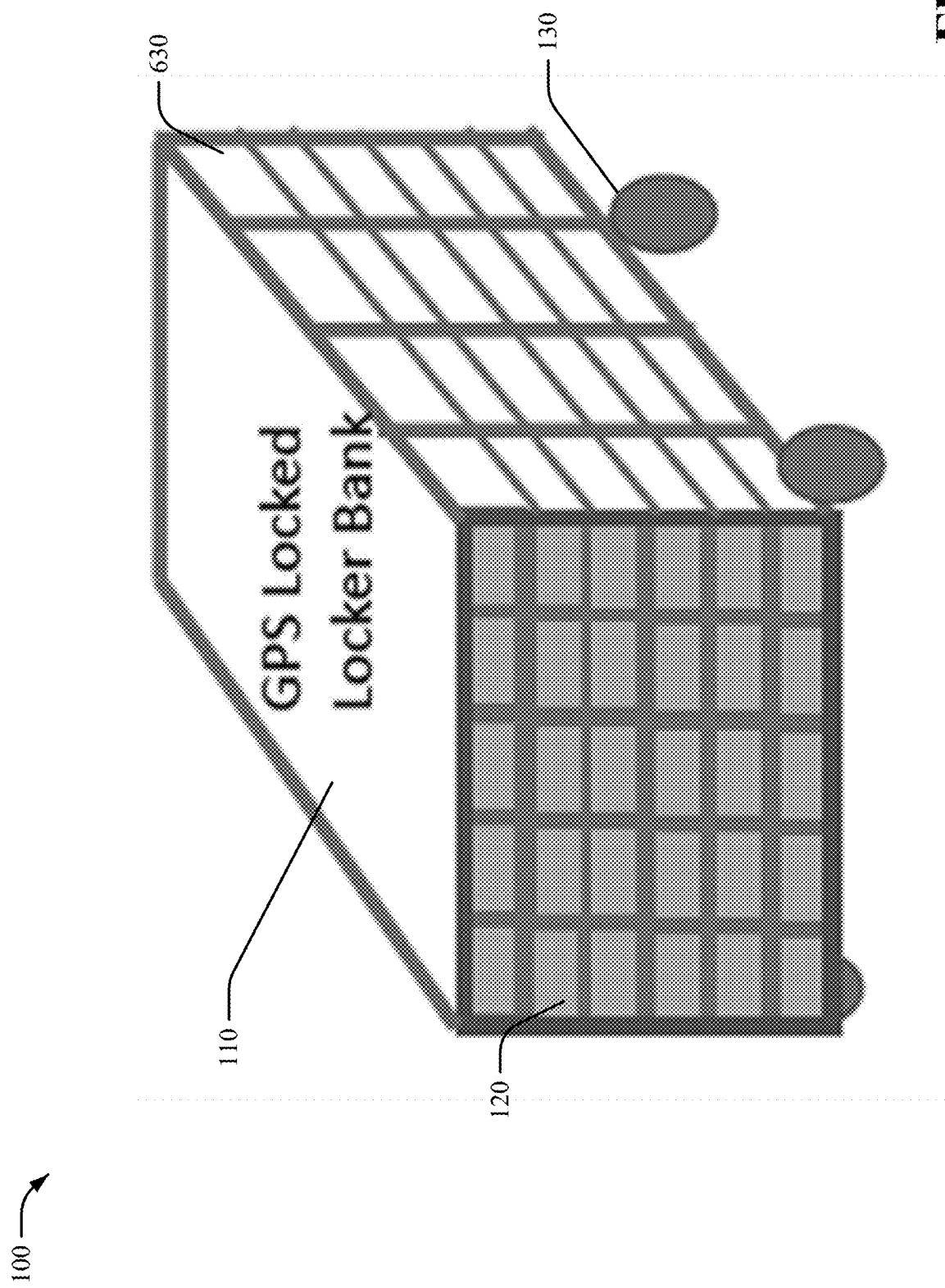
FIG. 1 illustrates a diagram of a non-limiting, example mobile smart locker device operations in accordance with one or more embodiments described herein.

Turning now to FIG. 1, illustrated is a diagram of a non-limiting, example mobile smart locker device operations in accordance with one or more embodiments described herein.

In an aspect, a GPS locked smart locker bank 100 is disclosed. In an instance locker bank 100 can comprise a series of wheels 130 configured to allow the smart lockers to move. For instance, a courier can drop off or pick-up the locker bank 100 according to a schedule. In another aspect, the locker bank can comprise compartments 120 configured to store parcels for pickup and drop off. Accordingly, such compartments can be accessible on any number of sides of the smart locker unit. For instance, first compartments 120 are located on a side wall and second compartments 630 are located on a front wall of bank 100.

In an aspect, the smart locker bank 100 can comprise a GPS navigation system that enables the smart locker to travel to various locations and establish a package hub. For instance, a smart locker bank 100 can travel from a fulfillment center that loads packages into the compartments of smart locker bank 100. The smart locker bank 100 can travel to one or more locked destination and upon arrival at such destination dock (e.g., at a driveway) where users can pick-up ordered packages from the fulfillment center and await for package recipients to obtain their packages from the compartment of the smart hub upon docking at the destination. Accordingly, smart locker bank 100 can serve as a package exchange hub at any of a variety of locations.

As such, smart locker bank 100 can utilize a GPS locker or other technical mechanism to lock the GPS when implementing a travel module configured to allow mobile smart locker bank 100 to travel between locations. In an aspect, the intelligent locking system employed by smart locker bank 100 can allow for the securing of packages within smart locker compartments during travel or when stationary. Furthermore, in a scenario where the mobile smart locker bank 100 is traveling to multiple destinations along a route, the GPS locking mechanism can allow for the unlocking of authorized compartments upon arrival at a particular destination or upon authentication of a particular user device authorized to unlock a compartment at a particular location. In an aspect, a destination GPS location coordinates can serve as dual factor authentication that must be satisfied in order for a transaction to complete. For instance, if autonomous package lockers are routed to multiple locations for multiple deliveries for multiple people in each location, then the GPS coordinates can be used to partitions the transactions and complete at home as well.

In another aspect, the smart locker bank 100 can automatically dock at various geolocations upon reaching such geolocation. In an instance, smart locker bank 100 can utilize antennas, to determine its position relative to a docking location. In another aspect, the target geolocation for docking can employ a radio frequency (RF) transmitter to identify the metes and boundaries of the target docking location for mobile smart locker bank 100. Furthermore, the antenna and RF transmitter can communicate via RF signal transmission between both items to determine, based on received signals by the antenna and an associated processor (e.g., server device, smart locker processor, etc.) the position of the smart locker bank 100 relative to the target geolocation. Upon reaching the desired geolocation, the smart locker bank 100 can employ a locking mechanism (e.g., wheel breaks) and station at the desired geolocation docking position. In another aspect, the ability to position smart locker hubs at any available site can allow for a reduced pollution impact and lower carbon footprint in that less courier stops and less delivery vehicles need be deployed to pickup and deliver packages.

Figure 2:
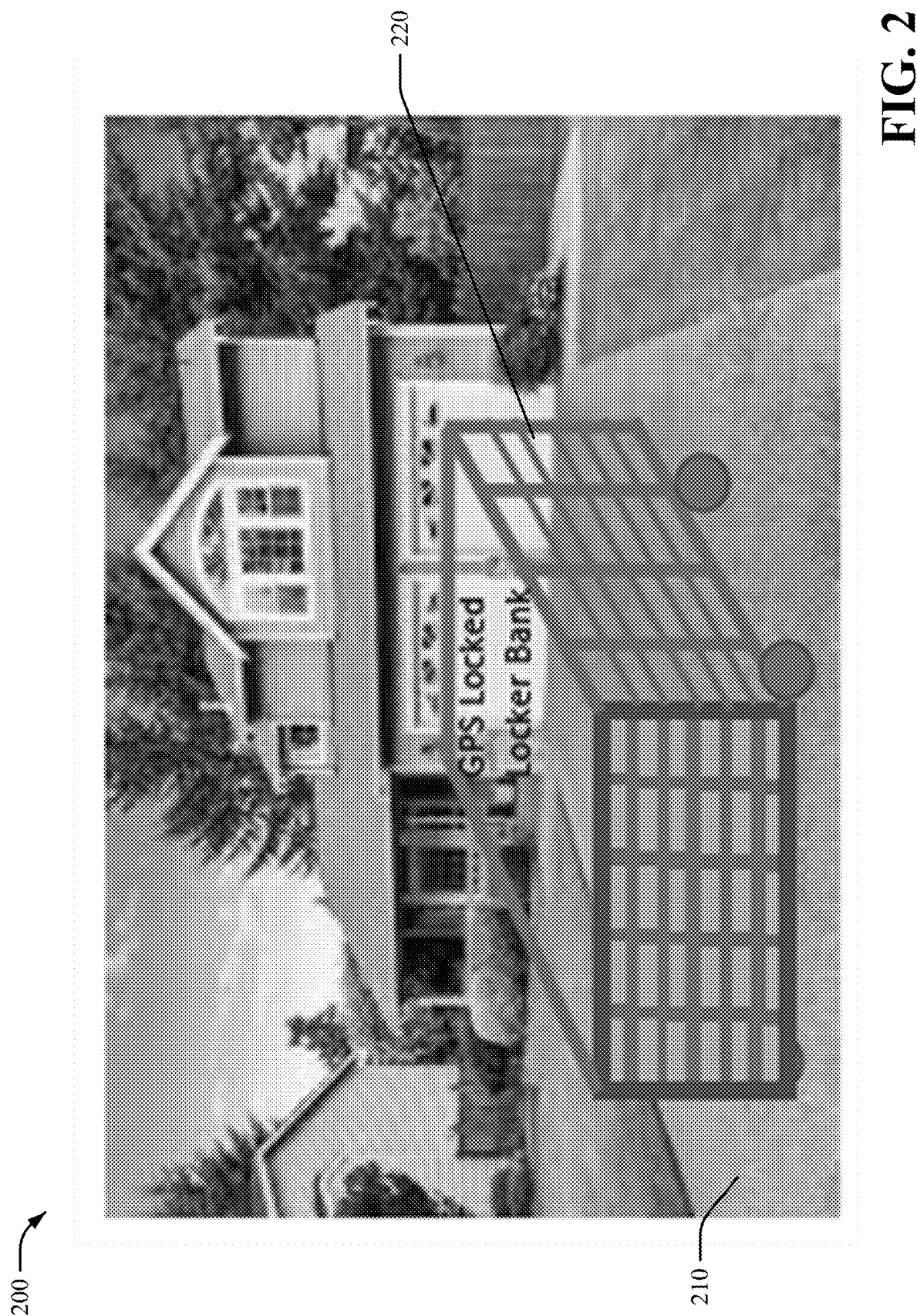
FIG. 2 illustrates a diagram of a non-limiting example smart locker device positioned at a residential location in accordance with one or more embodiments described herein.

Turning now to FIG. 2, illustrated is a diagram of a non-limiting example smart locker device positioned at a residential location in accordance with one or more embodiments described herein. In an aspect, FIG. 2 illustrates smart locker bank 220 positioned on a residential homeowners driveway 210. Furthermore, system 200 includes a residential implementation of the mobile smart locker banks 220, however, other non-residential implementations (e.g., commercial location positions) can be implemented as well.

In an aspect, smart locker bank 220 can be a smart locker bank 220 that has reached its geolocational destination and docked. In the illustration the geolocational destination is a provider's driveway. In an instance, a provider user device can provision an offer to station a smart locker bank 220 at his home location (e.g., driveway 210) for compensation such as soliciting rental income. A requestor device (e.g., a courier device) can select a provider's geolocation via a hardware and software system provisioning a geolocational listing platform to allow providers of available geolocational sites to offer sites to requestors for stationing smart locker banks 220. A requestor device may be a courier user device seeking a delivery path for packages. The requestor device may select from one or more available geolocational sites to schedule retrieval or delivery of packages. Furthermore, in an aspect, the requestor device may request the deployment of smart locker banks 220 at particular available sites that lack smart lockers but serve as a desirable location for package delivery or pickup hubs.

Figure 3:
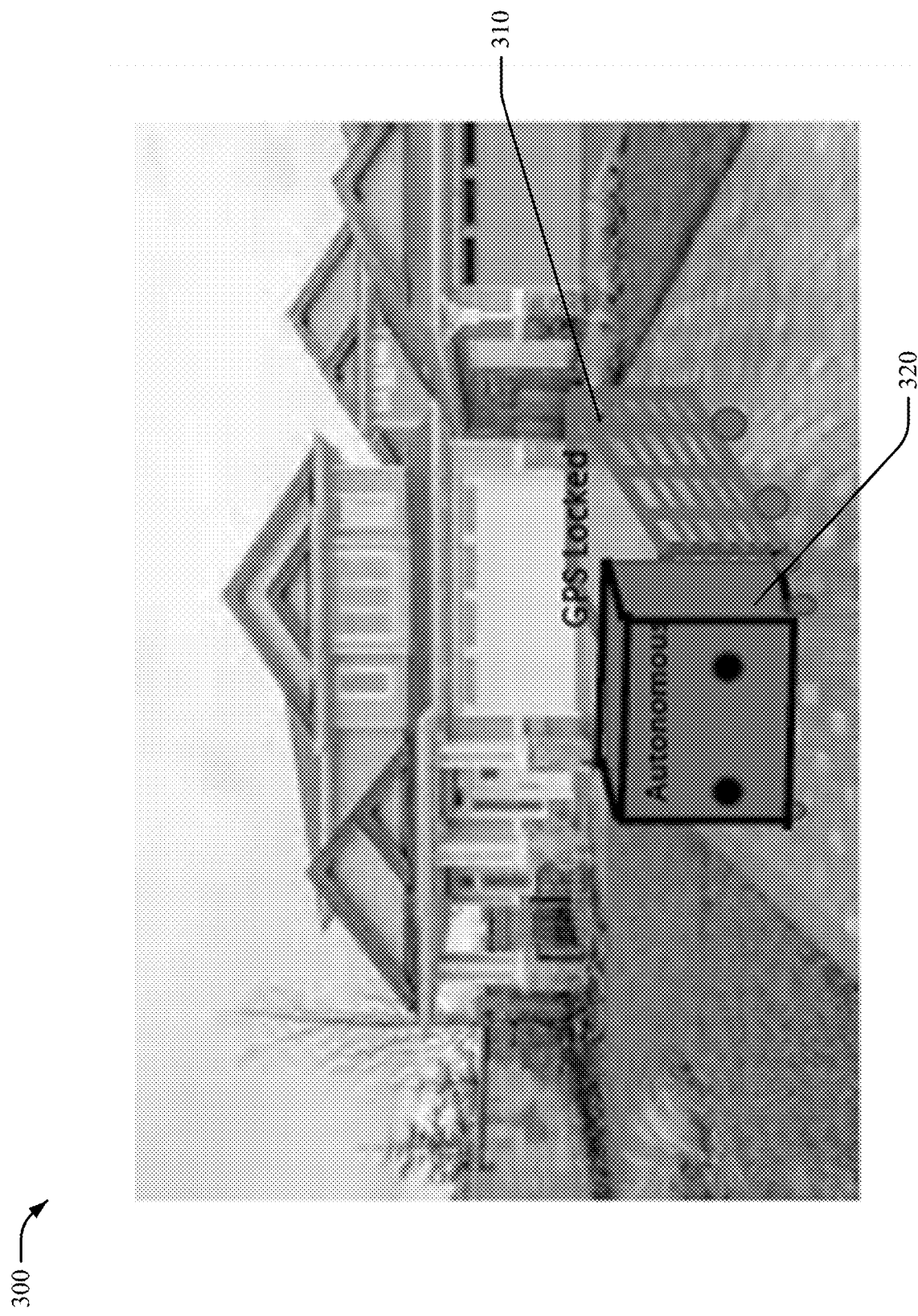
FIG. 3 illustrates a diagram of a non-limiting, example autonomous mobile smart locker device positioned at a residential location in accordance with one or more embodiments described herein.

FIG. 3 illustrates a diagram of a non-limiting, example autonomous mobile smart locker device positioned at a residential location in accordance with one or more embodiments described herein. In an aspect, FIG. 3 illustrates bank 310 positioned on a residential homeowners driveway. Furthermore, an autonomous vehicle 320 is transporting the mobile locker bank 310 in accordance with an automated delivery and pickup system 300. In an aspect, the autonomous vehicles configured to integrate (e.g., via a mounting mechanism) with one or more mobile smart locker device (e.g., smart locker banks comprising several compartments) such as via a hitching mechanism or other such implementation.

In an aspect, the benefits of such implementations include the ability for couriers to accomplish high density drop-off operations. For instance, a large number of smart lockers can be delivered in one instance via a courier delivering a smart locker bank to a residential driveway rather than individually delivered packages to independent residential addresses which can be staggered over several days depending on delivery schedules and deployment capabilities of the courier. Furthermore, the mobile smart locker banks 310 can allow for couriers to save costs due to the reduction in individual drop off or pickup runs. Furthermore, the smart locker bank will prevent a missed delivery from occurring. Also, the couriers don't need to maintain store operations in a neighborhood, the regular presence of a smart locker pod provides sufficient operational functions for package delivery and drop off.

A homeowner corresponding to the provider device can benefit from having a mobile smart locker bank at the home by allowing such home owner to generate rental revenue from allowing the smart locker to occupy a portion of the property such as a driveway. Also, the homeowner can enable commerce via positioning of the mobile smart locker banks. For instance, the homeowner can effectively inventorize the smart locker banks with its own business goods and use the banks to sell goods. Furthermore, any items can be allowed to be sold via the residential locker banks.

In another aspect, a new business owner can rent mobile locker banks on wheels and start a business overnight without the need for a brick-and-mortar store front. This can save costs to the new business owner and give rise to local zip code commerce exchanges within. Furthermore, the residential smart locker banks allow for peer to peer selling.

In another aspect, the residential smart locker banks can be interchangeable via a docking mechanism. For instance, the locker bank with wheels can be docked onto a vehicle or autonomous vehicle. Also, the mobile locker banks can be configured with cameras to perform vision-based operations and create a secure environment for consumers and homeowners. Also, a set of servers communicatively coupled to the smart locker banks creates a network of smart locker banks. Furthermore, the smart locker banks can be integrated via the series of servers with other third-party systems such as courier systems and inventor systems. In another aspect, various workflow modules can be executed by each smart locker bank to change the operational functionality of each smart locker bank depending on the locker purpose. For instance, a mobile smart locker bank can be at residential locations for half of the week and then be deployed at commercial locations for the other half of the week. As such, the operational workflow of the mobile smart lockers can be modified to conform to the needs of the specific user base and administrator base of each use of the banks.

Figure 4:
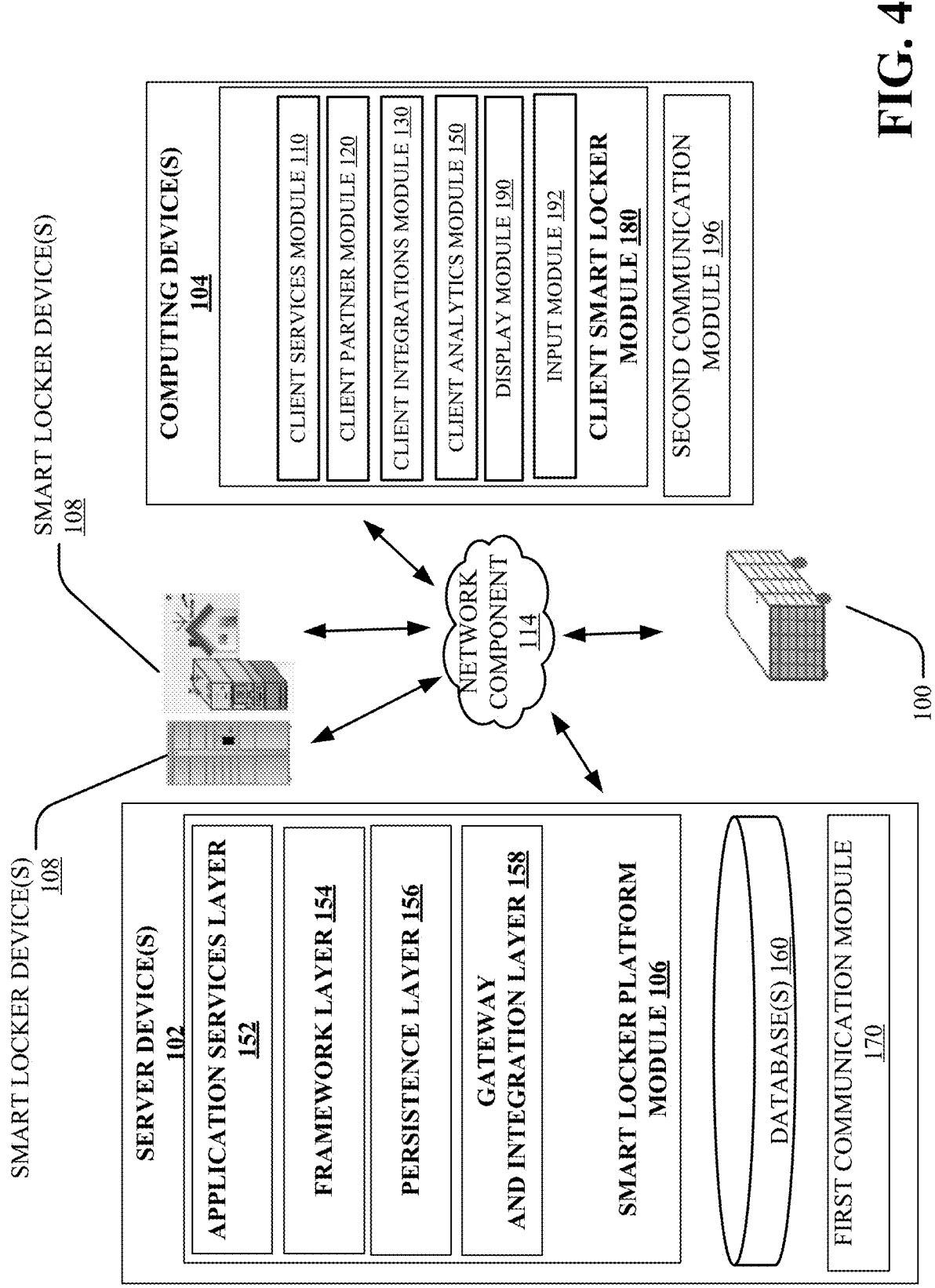
FIG. 4 illustrates a non-limiting example environment that can be used to generate an exchange location network and a platform to list and select available smart locker sites in accordance with one or more embodiments described herein.

Turning now to FIG. 4, presented is a non-limiting example environment 100 that includes one or more server device(s) 102, one or more smart locker device(s) 108, one or more mobile smart locker device 100 (and other mobile smart locker device embodiments disclosed herein) and one or more computing device(s) 104. In one or more non-limiting embodiment, mobile smart locker device 100 can employ one or more attribute of smart locker device(s) 108 and include additional configuration and functionality (e.g., wheels, automated navigation components, docking mechanisms, docking sensors, RF communication schemes, etc.). In an aspect, smart locker device(s) 108 can be configured as an assortment of one or more locker compartments connected physically (e.g., via hinge mechanism) and communicatively coupled to one or more server device(s) 102. The smart locker device(s) can comprise hardware components such as one or more mainboard (e.g., Bluetooth enabled mainboard), circuit breaker, power module, lock control board (e.g., to control the compartment and door locking mechanisms), lock components (e.g., electronic locks) configured to allow locking of the doors affixed to respective compartment, infrared sensors (e.g., to detect the presence or absence of packages), scanner component, power outlet component, socket components (e.g., USB), ports (e.g., 110V), power outlet (e.g., 110V), radio-frequency integrated circuit (RFIC) readers, bar code scanners (e.g., for package label reading), screws, cables, varied connectivity (e.g., ethernet, Wi-Fi, LTE, etc.) and other such components.

Furthermore, smart locker device(s) 108 can be configured to comprise varied materials (e.g., cold rolled sheets), surface treatments (e.g., powder coatings), color options, a range of structures (e.g., varied number of compartments, doors, compartment sizes, etc.), a range of packaging (e.g., wood casings), and expansion integrations. Furthermore, smart locker device(s) 108 can be configured to execute various operations such as refrigeration, heating, sanitization, de-contamination, and other such operations. For instance, a smart locker device(s) 108 with freezer capability can be configured to store, maintain, and provide access to perishable items such as produce and grocery products. In an aspect, such freezer configured smart locker device(s) 108 can comprise additional components such as additional power supplies, trip switches, cables, compressors, and other such components. Furthermore, the smart locker device(s) 108 can be configured to operate at a range of temperatures and thus be utilized as an indoor device. Furthermore, in an aspect, the smart locker device(s) 108 can be configured to maintain temperatures within compartments various ranges for refrigeration capabilities and freezer capabilities.

In other aspects, smart locker device(s) 108 can be configured to allow for an automatic open-door mechanism and/or manual compartment door opening mechanism. Furthermore, refrigeration configured smart locker device(s) 108 can comprise freezer compartments, refrigerant, insulation layers (e.g., polyurethane), varied insulation thickness (e.g., 100 mm), air cooling mechanisms (e.g., forced air mechanisms), controllers (e.g., digital), and/or a compressor component mounted in a range of positions (e.g., top of the unit, etc.). Furthermore, in some instances, smart locker device(s) 108 can comprise varied door types and sizes. For instance, a smart locker device(s) 108 can include a 17-door model (e.g., 13 small compartments, 2 medium, 2 large, etc.), 13 door model (e.g., 5 small, 6 medium, 2 large, etc.), 8 door model, 5 door model, and other such configurations.

In one or more non-limiting embodiment, smart locker device(s) 108 can comprise physical components comprising at least one or more of the following: compartments configured as package receptacles, user interface such as a touch screen or display monitor, compartment doors to provide access to the smart locker compartment, hinges configured to allow an opening and/or closing of the compartment door, locking components (e.g., resistant locks, high security locks, electronic locks, biometric locks, etc.), locker banks of varying shapes and/or sizes and/or dimensions (e.g., assortment of compartment sizes, add on locker bank portions), refrigeration smart lockers (e.g., insulation components, refrigerant components, etc.), heated smart lockers, sensor enabled components of such smart locker device(s) 108 (e.g., temperature sensor, weather sensor, humidity sensor, heat sensor, light sensor, pressure sensors, optical sensor configured for package detection, light beam obstruction and un-obstruction event driven detectors, package measurement sensors via light beams, weight sensors, etc.), drone drop compartments configured to receive packages via drone drop mechanisms, landing pad compartments, global positioning satellite chip enabled functionality, controlled substance compartments comprising heightened access requirements, emergency compartment configurations to carry emergency supplies for access by the general public in case of emergencies, base station for swiveling of a locker, surveillance camera components, microphone components, and other such components.

In another aspect, smart locker device(s) 108 can comprise a system comprising at least one processor, where the system is configured to execute operations such as access control to smart locker device compartments, identity validation of users or consumers of the smart locker device 186, electronic locking and unlocking mechanisms of the compartment lock, provisioning of user permissions to interact with eh smart lockers, execution of online and offline operational functions, controlling and initiating commands for the smart locker device 108, adjusting various settings, deploying presentations and graphics via a user interface display of the smart locker device 108, scheduling access operations, storing packages within the smart locker device 108, executing geo-fencing operations related to the smart locker device(s) 108, employing measuring functions of the smart locker device 108.

Furthermore, in one or more embodiment, smart locker device 108 can comprise firmware that can be configured to provide corresponding functionality between smart locker platform module 106 and client smart locker module 180. For instance, the firmware can be configurable to facilitate the exchange of information, such as images, package labels, audio, video, addresses, commands, queries, messages, and so forth. Furthermore, the firmware can drive hardware of the smart locker device(s) 108 to generate signals and/or process messages used in maintaining a wireless and/or wired communication session. In another aspect, the firmware can be configurable to facilitate data exchanges between smart locker device(s) 108 with other smart locker device(s) 10 and other devices (e.g., tablets, computers, smart phones, etc.). In another aspect, In another aspect, environment 100 comprises one or more server device(s) 102 can employ smart locker platform module 106 configured to execute smart locker device(s) 108 operations, manage smart locker systems, and facilitate all interactions between computing device(s) 104 and smart locker device(s) 108. In an aspect, one or more of the various components and/or modules further described herein can be communicatively coupled to a workload layer of a cloud computing environment to distribute processing activities across a cloud environment. In a non-limiting example embodiment smart locker platform module 106 can employ application services module 152, framework module 154, persistence module 156, and gateway and integration module 158.

In an aspect, smart locker platform module 106 can be configured as a platform that comprises various components, modules, and frameworks implemented to support, create, and manage applications corresponding to smart locker device(s) 108. In an aspect, platform module 106 can enable the delivery of functionality that is tailored to an array of devices such as smart locker device(S) 108 and computing device(s) 104 (e.g., servers, computing terminals, laptops, etc.). In one or more non-limiting implementations, the interconnected architecture of server device(s) 102 allows smart locker platform module 106 to scale and/or manage resources to optimally tailor experiences to all client devices (e.g., computing device(s) 104, smart locker device(s) 108) receiving cloud-based services.

In a non-limiting embodiment, a class of target devices can be created such that experiences can be tailored to the generic class of devices. For instance, a device class may comprise physical features, types of usage, or other common characteristics under a particular definition. Furthermore, in one or more implementation, smart locker platform module 106 can scale and/or manage resources to determine the optimal distributions of such resources among respective devices. For instance, several smart locker device(s) 108 may undertake a high volume of transactions at a given point in time (e.g. after work hours between 5 pm-6 pm) at which point, the smart locker platform module 106 may determine a scale-up of server resources are necessary to satisfy such spike in transactions.

As such smart locker platform module 106 can measure performance indicators of system 100, such indicators including storage usage, memory usage, network bandwidth and other parameters to determine the need for adding or removing resources to support vicissitudes in smart locker device(s) transaction support (e.g., data curation, execution of physical smart locker operations, generation of queries, procurement of insights, and other such indicators. In another aspect, smart locker platform module 106 can comprise various components and frameworks to create and manage applications related to smart locker device(s) 108. Furthermore, the smart locker platform module 106 can allow data to synchronize and share data faster across carious smart locker device applications.

In an aspect, platform module 106 can implement data redundancy across platform layers in order to prevent data loss and allow for greater opportunities to recapture data during data recovery events. Furthermore, smart locker platform module 106 can enable automation of connected device(s) such as smart locker device(s) 108 within the smart locker device environment.

In some embodiments, smart locker platform module 106 can enable operability and connectivity of devices such as hardware connectivity, device cloud connectivity, application connectivity, data management, data storage, data provisioning (e.g., amongst stakeholder systems and devices, sensors, applications), management of smart locker device(s) 108 and applications through wired and/or wireless networks, management of sensors and actuators of the smart locker device(s) 108, management and analysis of aggregated data corresponding to connected smart locker assets and networks to produce actionable insights for specific smart locker device challenges and functions, and other such operability.

In some non-limiting embodiments, smart locker platform module 106 can employ different types of stack architectures that employ multiple interconnected layers. For instance, smart locker platform module 106 can employ application layers, networking layers, workload layers, hardware layers, software layers, management layers, virtualization layers, and other such layers. Furthermore, various implementations can integrate aspects of smart locker platform module 106 into any one or more combination of layers utilizes by cloud-based services. In an instance, one or more of the layers and/or modules disclosed herein can be communicatively coupled to a workload layer of a cloud computing environment to distribute operations such as data generation, insight procurement, smart locker device(s) 108 operability, and other such operations. In an aspect, smart locker platform module 106 can employ application services layer 152, framework layer 154, persistence layer 156 and gateway and integration layer 158.

In a non-limiting embodiment, application services layer 152 can represent an organized of programmable components that interact with other layers (e.g., sequentially, hierarchically, etc.). In an aspect, application services layer 152, can be configured to implement functionality associated with one or more smart locker applications. Furthermore, the application service module can employ an interface configured to permit client device access to a series of applications in a uniform manner. In another aspect, application services layer 152 can enable applications to communicate within a common layer with a common application interface while also maintaining compartmentalization of application components. For instance, application services layer 152 can encapsulate access to a shared database and can plug into a source tree related to the application execution. Furthermore, in an aspect, application services layer 152 aggregate application-level operations configured for reuse by several clients (e.g., application-level logic is used in several different controllers), such as smart locker device(s) 108, client device(s) 104, complimentary devices (e.g., package reader devices integrated with the smart locker devices) and other such devices. In yet another aspect, application services layer 152 can be used as an aggregator for queries if it is over a repository pattern and over a query object pattern.

In another non-limiting embodiment, smart locker platform module 106 can employ infrastructure framework layer 154. In an aspect, infrastructure framework layer 154 can be configured as an abstracted set of executable code configured to provide tested general functionality to enable deployment of applications and integrations. The infrastructure framework layer 154 can also provide technical capabilities that support application services layer 152 and other such layers disclosed herein. In yet another aspect, infrastructure framework layer 154 can employ capabilities such as message sending for an application, persistence for one or more domain, drawing widgets for a user interface, and other such capabilities. Also, infrastructure framework layer 154 can be configured to support a pattern of interactions between other layers through an architectural framework.

In yet another non-limiting embodiment, smart locker platform module 106 can employ persistence layer 156 configured to mediate operations between a database engine and application services layer 152. Furthermore, persistence layer 156 enables efficient migration of data to other storage engines that encapsulate database logic within a single layer to enable future modification or replacement of database logic. Furthermore, persistence layer 156 can separate data access components of smart locker platform module 106 from the application execution components in case of a need to change databases. As such, persistence layer 156 allows for a data layer modification in some instances instead of the application services layer 152 or infrastructure framework layer 154.

In another aspect, smart locker platform module 106 can employ gateway and integration layer 158. In an aspect, gateway and integration layer 158 can be configured to register a consumer through a REST API by specifying a unique name and attribute filter for the user. Furthermore, in an aspect, within a fragmentally distributed infrastructural environment (e.g., independent infrastructures, manufacturers components of some smart locker devices), gateway and integration layer 158 can enable a sharing of data and collaboration amongst fragmented devices as well as back-end applications corresponding to a range of devices. Furthermore, gateway and integration layer 158 can be configured to act as an interface standardization tool for device-layer or application integration, orchestration layer for smart locker device(s) 108 resources and other back-end services among different organizations for service-layer integration, and/or execute structured and repeatable operations for smart locker device(s) 108.

In another non-limiting embodiment, server(s) 102 can comprise database(s) 160 configured to store information such as data. In an aspect, database(s) 160 can organize large volumes of data and address large amounts of structured and unstructured data. Furthermore, in an aspect, database(s) 160 can provision formats and structures that allow for consistency in stored data that generates efficiencies in how data is accessed and processed. In another aspect, database(s) 160 can represent any suitable source of data and/or information or storage for data generated by smart locker platform module 106. In another aspect, database(s) 160 can respond to queries, store data according to relational data models or data models or data curation requirements. Also, database(s) 160 can be configured to enable curated storage operations via a prioritization scheme of databases and/or data sources for access by the smart locker platform module 106.

In other embodiments, database(s) 160 can be configured to employ data updating prioritization schemes configured to reduce latency of performance associated with smart locker platform module 106 based de-prioritizing updates of less used and/or obscure data. Furthermore, in some instances, database(s) 160 can be programmatically accessed to return a value, sorted data, numeric sequence requested by smart locker platform module 106. In other instances, database(s) 160 can also store data at rest (e.g., store data after collection or generation) as well as store data in motion (e.g., data collected in real-time). Furthermore, database(s) 160 can employ an interface that can communicate with other device(s) and components such as smart locker platform module 106.

In another aspect, database(s) 160 can be configured as any suitable type of database, data warehouse and/or cloud application such as Structured Query Language (SQL) databases, enterprise data warehouses, data marts, software-as-a service (Saas) based applications, and other such databases. In an aspect, the database(s) 160 can be assigned to workspaces associated with each smart locker device(s) 108, respective computing device(s), and/or applications executing on smart locker platform module 106. Furthermore, database(s) 160 can employ tables and/or data structures to describe relations between data and device(s). As such, database(s) 160 can store relational data models associated with smart locker data curation for particular use (e.g., executing smart locker commands and/or operations).

In an aspect, database(s) 160 can include one or more database interfaces such as SQL interfaces. Furthermore, database(s) 160 can be configured to receive database access commands, consolidate data access events. In another aspect, database(s) 160 can comprise learning databases (e.g., anecdotal data associated with thematic databases such as those databases associated with images, text, package label images, formatting data, addresses, and other such learning databases). In another aspect, database(s) 160 can curate images associated with key words such as "package", "label", "shipping", "address", and other such images.

In another aspect, server(s) 102 can employ first communication module 170 configured as a component of a server that communicates with external devices. Furthermore, first communication module 170 is configured to represent any suitable combination of hardware, software, and/or firmware configurable to facilitate the exchange of information (e.g., images, audio, video, commands, queries, messages, etc.). In another aspect, first communication module 170 can include protocol stacks associated with a network over which data can be exchanged, firmware that can cause the hardware to generate signals and/or process messages used to maintain a wireless communication session.

In an aspect, some implementations include computer networking ports such as Transmission Control Protocol (TCP) port, User Datagram Protocol (UDP) port, File Transfer Protocol (FTP) port, Hypertext Transfer Protocol (HTTP) port, Internet Message Access Protocol (IMAP) port, and Physical communication ports. In yet another aspect, first communication module 170 can be configured to include physical communication ports, serial ports, parallel ports, keyboard ports, universal serial bus (USB) ports, a keyboard port, a display port, an audio port, and other such ports. Furthermore, in an aspect, first communication module 170 can be configured to connect server(s) 102 to other devices over communication cloud 128, such as computing device(s) 104.

In another aspect, system 100 can include computing device 104 which can include client smart locker module 180 that generally represent user access some or all of the functionality provided by client smart locker module 180. In an aspect, computing device(s) 104 can be any suitable type of computing device such as a desktop computing device, a smart phone, a tablet, a laptop, a smart watch and so forth. Furthermore, client smart locker module 180 can provision output information generated from a combination of input data and user information based on smart locker device(s) preferences and other such information.

In some implementations, client smart locker module 180 can represent user access to some or all of the functionality provided by smart locker platform module 106. In another aspect, client smart locker module 180 can represent a stand-alone client application that interfaces into smart locker platform module 106. Furthermore, client smart locker module 180 can represent a browser that remotely logs onto a website hosted by server(s) 102. For instance, client smart locker module 180 and smart locker platform module 106 are illustrated as residing on separate devices, however, some implementations combine some or all the respective module functionality into a single computing device as further described herein. Further, in various implementations, computing device(s) 104 can use client smart locker module 180 to access smart locker device(s) 108 as further described herein. In other implementations, computing device(s) 104 can use client smart locker module 180 to access cloud-based services provided by server(s) 102 via a browser that can remotely log onto a site hosted by server(s) 102. In such example, client smart locker module 180 can include a user interface such as display module 190 to provide user access into features provided by the system, such as inputting a search query, provided user feedback, requesting reports, accessing a dashboard, scheduling smart locker device operations, opening a smart locker compartment, unlocking a smart locker locking mechanism, querying smart locker device data, and other such features.

In a non-limiting embodiment, client smart locker module 180 can employ client services module 110 configured to correspond to a client application that can render a user interface on a corresponding display device (e.g., tablet, computer, etc.), and communicates over a network to a server application such as smart locker platform module 106. In another aspect, client services module 110 can represent a stand-alone application that includes the functionality of service applications executing on smart locker platform module 106 and/or smart locker device(s) 108. For instance, such service applications can include a mailroom service, locker service, service room, inventory service, package room service, recipient services, service level management service, user detection and identification services and other such applications.

In another non-limiting embodiment, client smart locker module 180 can employ client partner module 120 configured to employ a client application that can render a user interface on a corresponding display device (e.g., tablet, computer, smart locker device, etc.), and communicate over a network to a server application such as smart locker platform module 106. Furthermore, client partner module 120 can represent a stand-alone application that can include the functionality of partner applications executing on smart locker platform module 106 and/or smart locker device(s) 108. For instance, such partner applications can include horizontal partners such as network configuration partners, security partners, data visualization partner systems, and/or smart locker device orchestration applications.

In another non-limiting embodiment, client smart locker module 180 can employ client integration module 130. In an aspect, client integration module 130 corresponds to a client application that renders a user interface on a corresponding display device (e.g., tablet, computer, etc.) and communicate over a network to a server application such as smart locker platform module 106. In another aspect, client integration module 130 can represent a stand-alone application that includes the functionality of integrations applications executing on smart locker platform module 106. For instance, such integrations can include a single-sign on application for various identity providers and service providers related to smart locker device(s).

Other integrations can include an API based integrations configured to transmit information and extract information and vice versa to respective API's of smart locker platform module 106. Other integrations can include event-driven integrations configured to receive events such as notification events corresponding to status changes or other events corresponding to the smart locker platform module 106 or smart locker device(s) (e.g., locker door is left open, locker has package in it, locker door is jammed). In other implementations, integrations can include package tracking, package management applications, customer application integrations (e.g., retailers, universities, apartments, wholesalers, etc.), user data import applications or systems. Furthermore, client integration module 130 can provide device access to various features corresponding to integrations provided by the smart locker platform module 106 or smart locker device(s).

In another non-limiting embodiment, client smart locker module 180 can employ client analytics module 150. In an aspect, client analytics module 150 can correspond to a client application that renders a user interface on a corresponding display device (e.g., tablet, computer, etc.), and communicate over a network to a server application such as smart locker platform module 106. Furthermore, client analytics module 150 can represent a stand-alone application that includes the functionality of analytics applications executing on smart locker platform module 106. In another aspect, client analytics module 150 can receive analytics related to the smart locker device(s) over network 114. Furthermore, various triggering events (e.g., package deposited, package retrieved, label tracking info. extracted, transaction occurred) can provision insights and information to the client analytics module 150. In yet another aspect, client analytics module can accesses various features corresponding to analytics generation, management and provisioning provided by the smart locker platform module 106. In another aspect, client device(s) 104 can employ second communication module 196 configured as a combination of hardware, software, and/or firmware that is configurable to facilitate data exchanges with other devices.

In another aspect, server device(s) 102 and smart locker platform module 106 can employ a listing module configured to employ the listing functionality of provider sites and receive requestor requests for sites and mobile smart locker hubs. In an aspect smart locker platform module employing listing module can communicatively couple with mobile smart locker devices 100. In a non-limiting embodiment, a provider device or requestor device (e.g., courier) can be client device(s) 104. In yet another aspect, smart locker platform module 106 can employ a reservation system, an availability module, an acceptance module, a calendar module, a query module, a booking module, a curation module, and/or a messaging module to facilitate execution of one or more range of operations associated with the listing functionality.

Figure 5A:
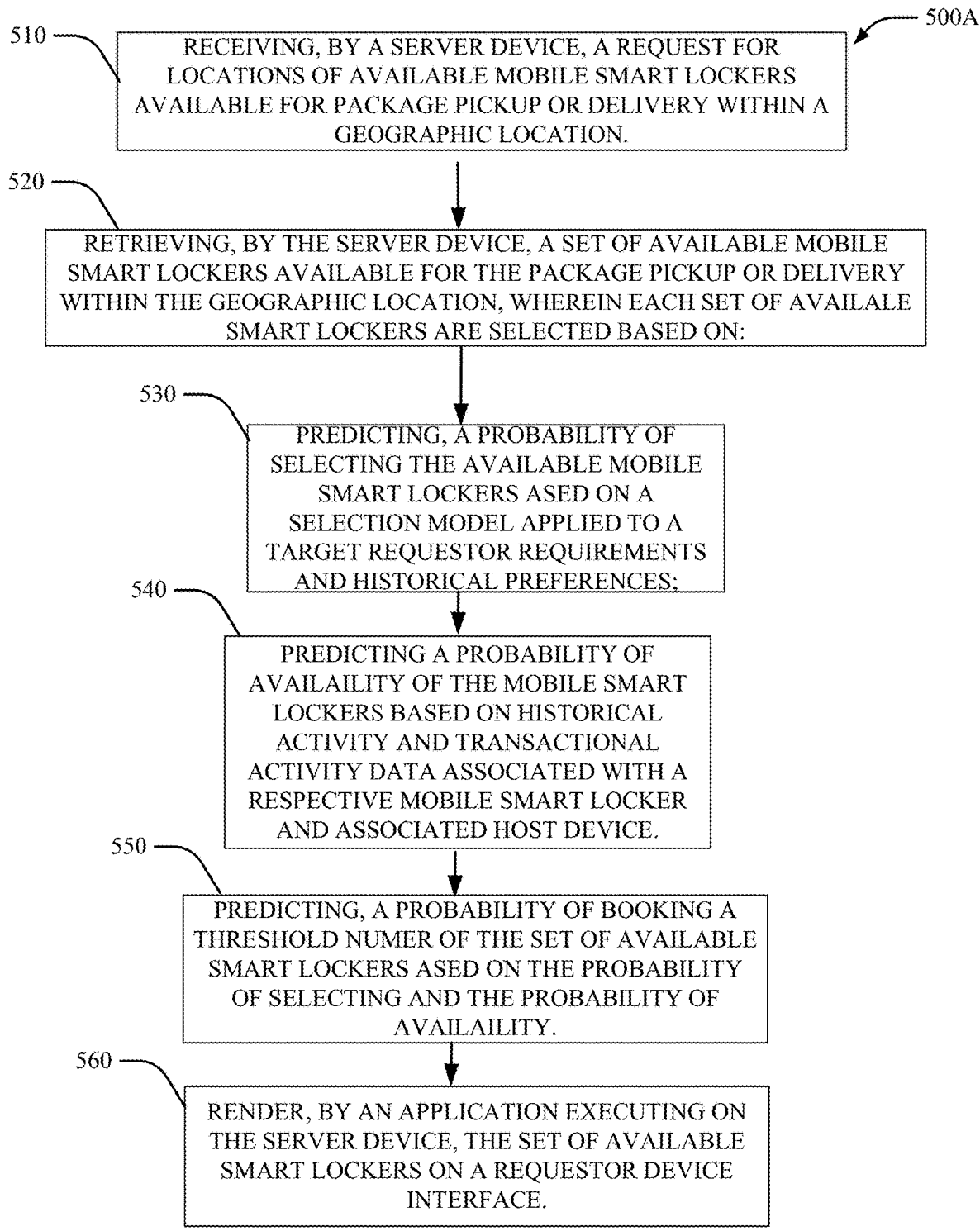
FIG. 5A illustrates a non-limiting method that can be utilized to render a set of available smart lockers on a device in accordance with one or more embodiments described herein.

Turning now to FIG. 5A, illustrated is a block diagram 500A of a non-limiting method 500A of provisioning a list one or more smart locker device sites available for booking in accordance with one or more embodiments described herein. Repetitive description of like elements employed in other embodiments described herein is omitted for sake of brevity.

At reference numeral 510, a server device receives a request for locations of available mobile smart lockers available for package pickup or delivery within a geographic location. At reference numeral 512, the server device retrieves a set of available mobile smart lockers available for the package pickup or delivery within the geographic location, wherein, each of the set of available smart lockers are selected based on: at referenced numeral 514, predicting, a probability of selecting the available mobile smart lockers based on a selection model applied to a target requestor requirements and historical preferences, at reference numeral 516, predicting, a probability of availability of the mobile smart lockers based on historical activity and transactional activity data associated with a respective mobile smart locker and associated host device; at reference numeral 518, predicting, a probability of booking a threshold number of the set of available smart lockers based on the probability of selecting and the probability of availability. At reference numeral 520, an application executing on the server device renders the set of available smart lockers on a requestor device interface.

In other non-limiting method embodiments, the method can further include extracting, by the server device, a set of insights from the predicting the probability of selecting the available mobile smart lockers and the predicting the probability of availability of the mobile smart lockers. In other non-limiting method embodiments, the method can further include training, by a set of server devices, a predictive model based on the set of insights extracted from the predicting the probability of selecting the available mobile smart lockers and the predicting the probability of availability of the mobile smart lockers.

In other non-limiting method embodiments, the method can include updating, by the server device, a machine learning model associated with the retrieving the set of available mobile smart lockers, with the extracted set of insights. In other non-limiting method embodiments, the method can include comparing the predicting the probability of the selecting the available mobile smart lockers to a final booking activity of the requestor; and comparing the predicting the probability of availability of the mobile smart lockers to an actual availability of the mobile smart lockers.

In other non-limiting method embodiments, the method can include wherein the machine learning model is a recurrent neural network, a convolutional neural network, or a combination thereof. In other non-limiting method embodiments, the method can include wherein an insight comprises a relationship between one or more selections based on interactions between requestors and mobile smart locker providers.

Figure 5B:
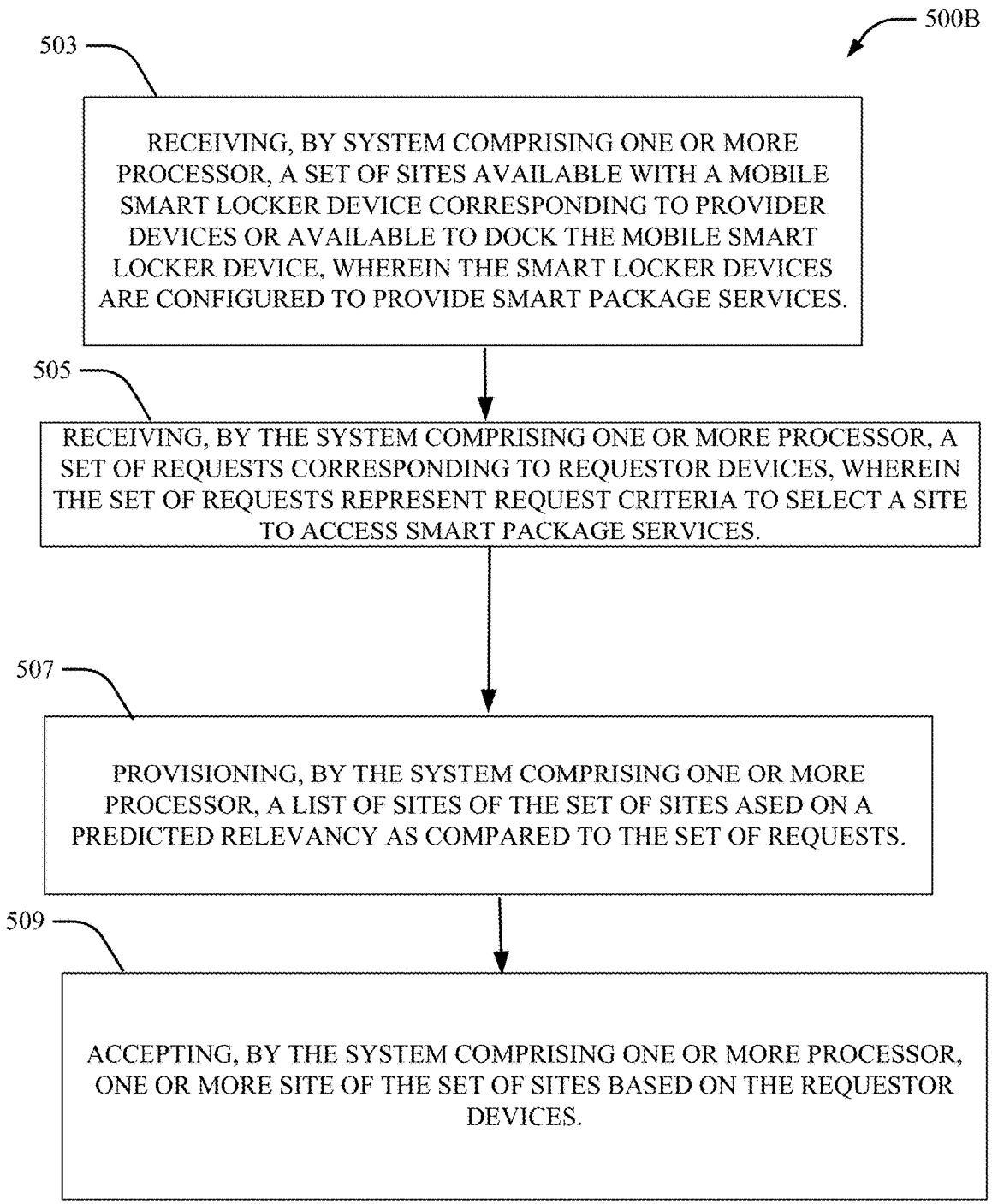
FIG. 5B illustrates a non-limiting method that can be utilized to accept one or more site on the set of sites based on the requestor devices in accordance with one or more embodiments described herein.

Turning now to FIG. 5B, illustrated is a block diagram 500B of a non-limiting method 500B of provisioning a list one or more smart locker device sites available for booking in accordance with one or more embodiments described herein. Repetitive description of like elements employed in other embodiments described herein is omitted for sake of brevity.

At reference numeral 503, a system comprising one or more processor receives a set of site available with a mobile smart locker device corresponding to provider devices or available to dock the mobile smart locker device, wherein the smart locker devices are configured to provide smart package services. At reference numeral 505, the system comprising one or more processor receives a set of requests corresponding to requestor devices, wherein the set of requests represent request criteria to select a site to access smart package services. At reference numeral 507, the system comprising one or more processor provisions a list of sites of the set of sites based on a predicted relevancy as compared to the set of requests. At reference numeral 509, the system comprising one or more processor accepts one or more site of the set of sites based on the requestor devices.

In other non-limiting method embodiments, the method can include the system comprising one or more processor generating a suggested navigation route between one or more of the set of sites based on a set of site geography requests. In another aspect they system can score the set of site availability data based on relevancy to the set of request data; ranking the set of location availability data based on the score; and render the ranked set of locations at a user device interface corresponding to a requestor.

Figure 5C:
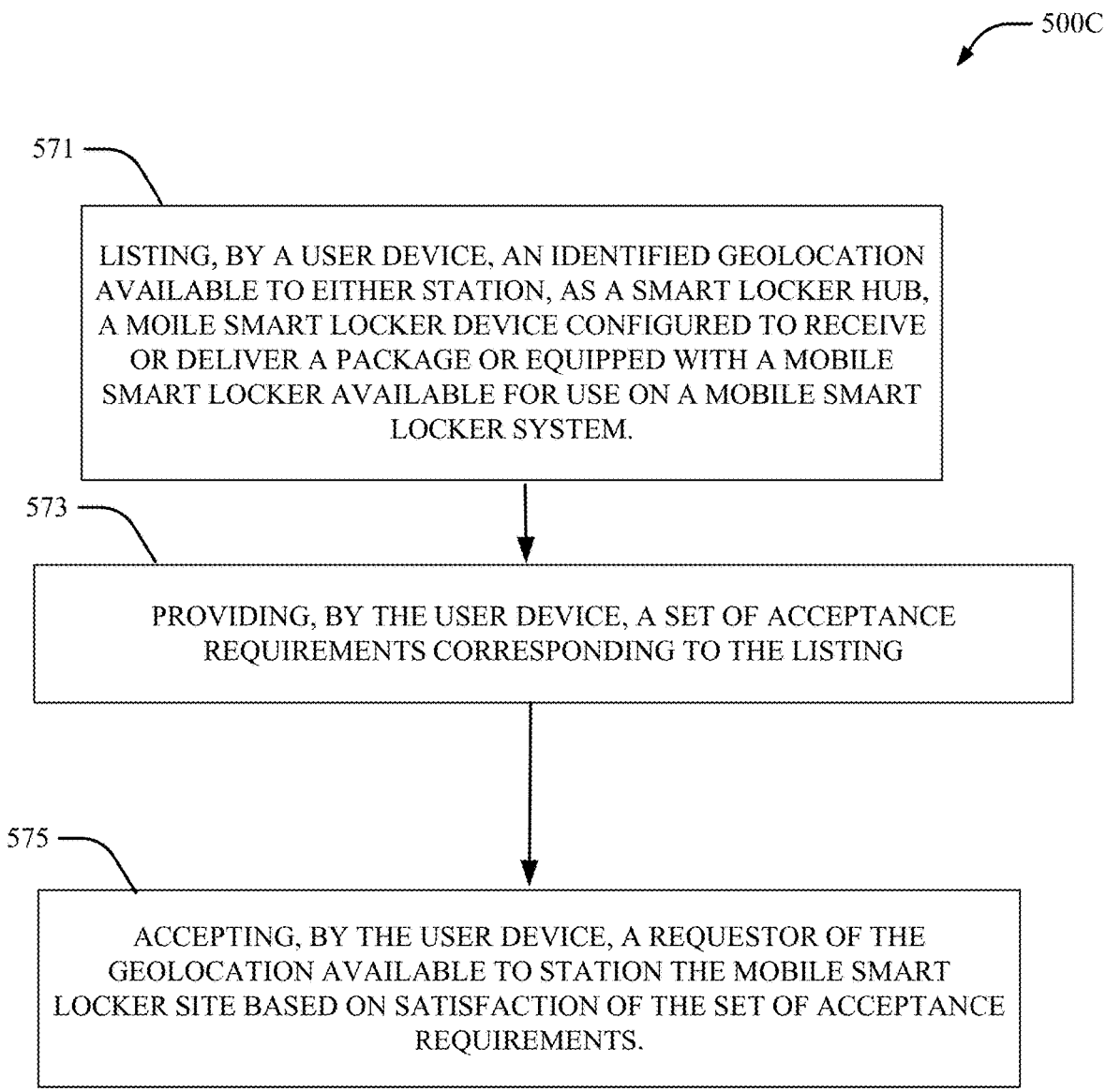
FIG. 5C illustrates a non-limiting method that can be utilized to accept a requestor use of a geolocational site in accordance with one or more embodiments described herein.

Turning now to FIG. 5C, illustrated is a block diagram 500C of a non-limiting method 500C of provisioning a list one or more smart locker device sites available for booking in accordance with one or more embodiments described herein. Repetitive description of like elements employed in other embodiments described herein is omitted for sake of brevity.

At reference numeral 571, a user device lists an identified geolocation available to either station, as a smartlocker hub, a mobile smart locker configured to receive or deliver a package or equipped with a mobile smart locker available for use on a mobile smart locker booking system. At reference numeral 573, the user device provides a set of acceptance requirements corresponding to the listing. At reference numeral 575, the user device accepts a requestor of the geolocation available to station the mobile smart locker site based on satisfaction of the set of acceptance requirements.

In other non-limiting method embodiments, the method can include storing the listings in a data store; curating the listings based on relevancy insights to requestors; and generating attributes of the relevancy insights that correspond to bookings of the identified smart locker site.

In other non-limiting method embodiments, the method can include updating the relevancy insights; and curating the listings based on the updated relevancy insights. In other non-limiting method embodiments, the method can include triggering, by a server device, a deployment of the mobile smart locker based on a booking of the identified geolocation available to station the mobile smart locker at the identified site.

In other non-limiting method embodiments, the method can include receiving, by a mobile smart locker device, instructions to travel to the identified geolocation; and traveling, by the mobile smart locker device, to the identified geolocation based on an automated global positioning system locking mechanism. In other non-limiting method embodiments, the method can include docking a smart locker device at the identified geolocation based on the following: authenticating, by an application executing on the user device corresponding to the identified geolocation; and matching a current coordinate of the mobile smart locker device with the identified geolocation.

In other non-limiting method embodiments, the method can include navigating the mobile smart locker device to autonomously drive to another geo location based upon an occurrence of a triggering event at the identified geolocation. In other non-limiting method embodiments, the method can include matching a current coordinate of the mobile smart locker device with the identified geolocation.

In other non-limiting method embodiments, the method can include restricting a docking of mobile smart lockers within a predefined proximal range of another docked mobile smart locker. In other non-limiting method embodiments, the method can include deploying vision-based security mechanisms via cameras employed by the mobile smart lockers. In other non-limiting method embodiments, the method can include navigating the mobile smart locker device to a fulfillment center geolocation based on another predetermined triggering event. In other non-limiting method embodiments, the method can include notifying a requestor of an availability of a previously identified or queried geolocation.

Figure 6:
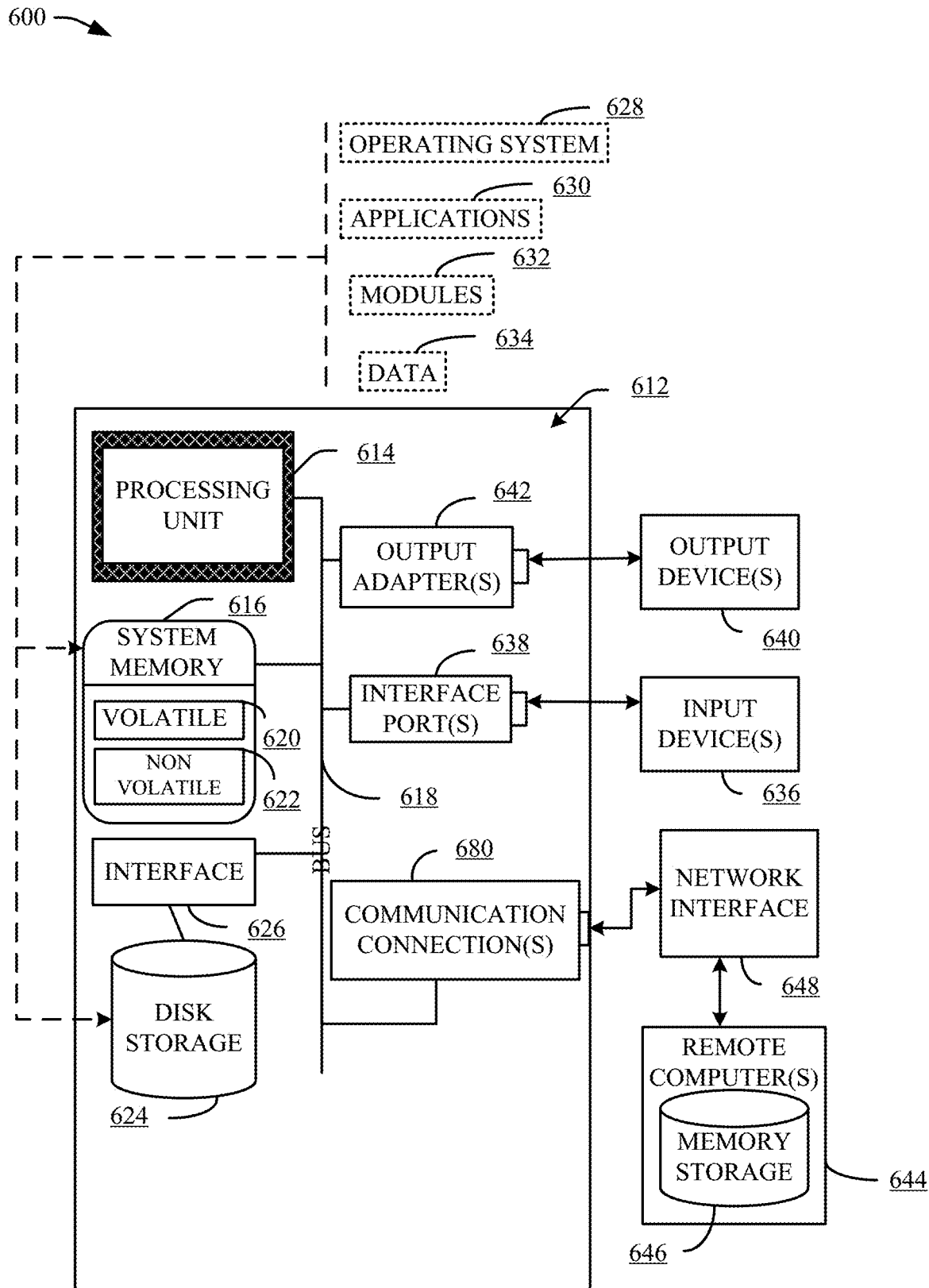
FIG. 6 illustrates a block diagram of an example, non-limiting operating environment in which one or more embodiments described herein can be facilitated.

FIG. 6 illustrates a flow diagram of an example, non-limiting operating environment in which one or more embodiments described herein can be facilitates. Repetitive description of like elements employed in other embodiments described herein is omitted for sake of brevity.

In order to provide a context for the various aspects of the disclosed subject matter, FIG. 6 as well as the following discussion is intended to provide a general description of a suitable environment in which the various aspects of the disclosed subject matter can be implemented. FIG. 6 illustrates a block diagram of an example, non-limiting operating environment in which one or more embodiments described herein can be facilitated. With reference to FIG. 6, a suitable operating environment 600 for implementing various aspects of this disclosure can also include a computer 612. The computer 612 can also include a processing unit 614, a system memory 616, and a system bus 618. The system bus 618 couples system components including, but not limited to, the system memory 616 to the processing unit 614.

The processing unit 614 can be any of various available processors. Dual microprocessors and other multiprocessor architectures also can be employed as the processing unit 614. The system bus 618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 616 can also include volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 620 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 612 can also include removable/non-removable, volatile/non-volatile computer storage media. FIG. 6 illustrates, for example, a disk storage 624. Disk storage 624 can also include, but is not limited to, devices like a magnetic disk drive, floppy disk drive, tape drive, Jaz drive, Zip drive, LS-100 drive, flash memory card, or memory stick. The disk storage 624 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 624 to the system bus 618, a removable or non-removable interface is typically used, such as interface 626. FIG. 6 also depicts software that acts as an intermediary between users and the basic computer resources described in the suitable operating environment 600. Such software can also include, for example, an operating system 628. Operating system 628, which can be stored on disk storage 624, acts to control and allocate resources of the computer 612.

System applications 630 take advantage of the management of resources by operating system 628 through program modules 632 and program data 634, e.g., stored either in system memory 616 or on disk storage 624. It is to be appreciated that this disclosure can be implemented with various operating systems or combinations of operating systems. A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638.

Interface port(s) 638 include, for example, a serial port, a parallel port, a game port, and a universal serial bus (USB). Output device(s) 640 use some of the same type of ports as input device(s) 636. Thus, for example, a USB port can be used to provide input to computer 612, and to output information from computer 612 to an output device 640. Output adapter 642 is provided to illustrate that there are some output device 640 like monitors, speakers, and printers, among other such output device 640, which require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a computer, a server, a router, a network PC, a workstation, a microprocessor based appliance, a peer device or other common network node and the like, and typically can also include many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 650 refers to the hardware/software employed to connect the network interface 648 to the system bus 618. While communication connection 650 is shown for illustrative clarity inside computer 612, it can also be external to computer 612. The hardware/software for connection to the network interface 648 can also include, for exemplary purposes only, internal and external technologies such as, modems including regular telephone grade modems, cable modems and DSL modems, ISDN adapters, and Ethernet cards.

Figure 7:
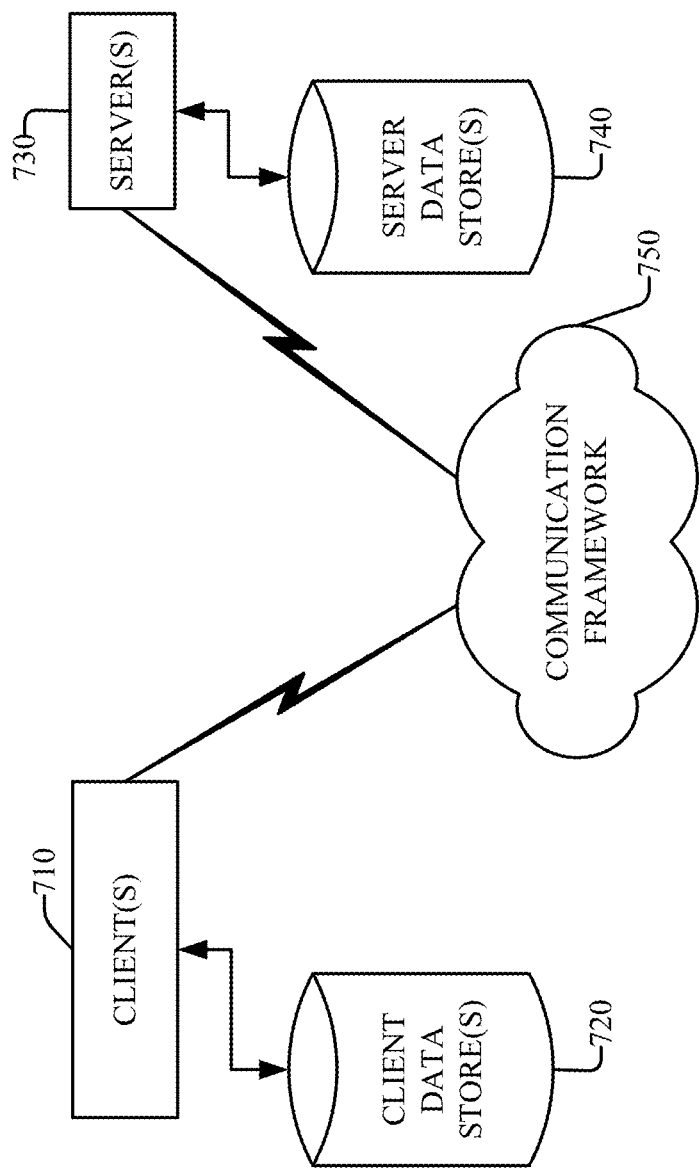
FIG. 7 illustrates a block diagram of an example, non-limiting operating environment in which one or more embodiments described herein can be facilitated.

FIG. 7 illustrates a flow diagram of an example, non-limiting operating environment in which one or more embodiments described herein can be facilitated.

Referring now to FIG. 7, there is illustrated a schematic block diagram of a computing environment 700 in accordance with this disclosure. The system 700 includes one or more client(s) 702 (e.g., laptops, smart phones, PDAs, media players, computers, portable electronic devices, tablets, and the like). The client(s) 702 can be hardware and/or software (e.g., threads, processes, computing devices). The system 700 also includes one or more server(s) 704. The server(s) 704 can also be hardware or hardware in combination with software (e.g., threads, processes, computing devices). The servers 704 can house threads to perform transformations by employing aspects of this disclosure, for example. One possible communication between a client 702 and a server 704 can be in the form of a data packet transmitted between two or more computer processes wherein the data packet may include video data. The data packet can include a metadata, e.g., associated contextual information, for example. The system 700 includes a communication framework 706 (e.g., a global communication network such as the Internet, or mobile network(s)) that can be employed to facilitate communications between the client(s) 702 and the server(s) 704.

Communications can be facilitated via a wired (including optical fiber) and/or wireless technology. The client(s) 702 include or are operatively connected to one or more client data store(s) 708 that can be employed to store information local to the client(s) 702 (e.g., associated contextual information). Similarly, the server(s) 704 are operatively include or are operatively connected to one or more server data store(s) 710 that can be employed to store information local to the servers 704. In one embodiment, a client 702 can transfer an encoded file, in accordance with the disclosed subject matter, to server 704. Server 704 can store the file, decode the file, or transmit the file to another client 702. It is to be appreciated, that a client 702 can also transfer uncompressed file to a server 704 and server 704 can compress the file in accordance with the disclosed subject matter. Likewise, server 704 can encode video information and transmit the information via communication framework 706 to one or more clients 702.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   receiving, by a server device, a request for locations of available mobile smart lockers available for package pickup or delivery within a geographic location;
   retrieving, by the server device, a set of available mobile smart lockers available for the package pickup or delivery within the geographic location;
   wherein, each of the set of available smart lockers are selected based on:
      predicting, a probability of selecting the available mobile smart lockers based on a selection model applied to a target requestor requirements and historical preferences;
      predicting, a probability of availability of the mobile smart lockers based on historical activity and transactional activity data associated with a respective mobile smart locker and associated host device;
      predicting, a probability of booking a threshold number of the set of available smart lockers based on the probability of selecting and the probability of availability; and
   render, by an application executing on the server device, the set of available smart lockers on a requestor device interface.

2. The method of claim 1, further comprising:
   extracting, by the server device, a set of insights from the predicting the probability of selecting the available mobile smart lockers and the predicting the probability of availability of the mobile smart lockers; and
   training, by a set of server devices, a predictive model based on the set of insights extracted from the predicting the probability of selecting the available mobile smart lockers and the predicting the probability of availability of the mobile smart lockers.

3. The method of claim 2, further comprising:
   updating, by the server device, a machine learning model associated with the retrieving the set of available mobile smart lockers, with the extracted set of insights.

4. The method of claim 3, wherein the machine learning model is a recurrent neural network, a convolutional neural network, or a combination thereof.

5. The method of claim 1, wherein an insight of the set of insights comprises:
   comparing the predicting the probability of the selecting the available mobile smart lockers to a final booking activity of the requestor; and
   comparing the predicting the probability of availability of the mobile smart lockers to an actual availability of the mobile smart lockers.

6. The method of claim 1, wherein an insight comprises a relationship between one or more selections based on interactions between requestors and mobile smart locker providers.

* * * * *